(12) United States Patent
Dusterhoft et al.

(10) Patent No.: US 10,106,728 B2
(45) Date of Patent: Oct. 23, 2018

(54) CLUSTERS OF MICRON- AND NANO-SIZED PROPPANT FOR USE IN SUBTERRANEAN OPERATIONS

(71) Applicant: Halliburton Energy Services, Inc., Houston, TX (US)

(72) Inventors: Ronald G. Dusterhoft, Katy, TX (US); Philip D. Nguyen, Houston, TX (US); Loan K. Vo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/105,737

(22) PCT Filed: Jan. 22, 2014

(86) PCT No.: PCT/US2014/012503
§ 371 (c)(1),
(2) Date: Jun. 17, 2016

(87) PCT Pub. No.: WO2015/112132
PCT Pub. Date: Jul. 30, 2015

(65) Prior Publication Data
US 2016/0319189 A1    Nov. 3, 2016

(51) Int. Cl.
*E21B 43/267*    (2006.01)
*C09K 8/80*    (2006.01)
(Continued)

(52) U.S. Cl.
CPC .................. *C09K 8/80* (2013.01); *C09K 8/62* (2013.01); *C09K 8/70* (2013.01); *C09K 8/92* (2013.01);
(Continued)

(58) Field of Classification Search
CPC .... E21B 43/267; C09K 8/805; C09K 2208/18
(Continued)

(56) References Cited

U.S. PATENT DOCUMENTS

| 5,422,284 A | 6/1995 | Lau |
| 5,787,986 A * | 8/1998 | Weaver .................... C09K 8/56 166/276 |

(Continued)

FOREIGN PATENT DOCUMENTS

WO    2010/084009 A1    7/2010

OTHER PUBLICATIONS

International Search Report and Written Opinion issued in related PCT Application No. PCT/US2014/012503 dated Oct. 22, 2014, 18 pages.

(Continued)

*Primary Examiner* — William D Hutton, Jr.
*Assistant Examiner* — Ashish K Varma
(74) *Attorney, Agent, or Firm* — Craig Roddy; Baker Botts L.L.P.

(57) ABSTRACT

Compositions and methods for forming and using clusters of micron- and/or nano-sized solid materials (e.g., particulates, fibers, etc.) as proppants in subterranean operations are provided. In one embodiment, the methods comprise: providing a fracturing fluid comprising a base fluid, a plurality of small-sized solid materials and one or more surface modifying agents; forming a plurality of proppant clusters, each proppant cluster comprising two or more of the small-sized solid materials bound together with a portion of the one or more surface modifying agents; and introducing the fracturing fluid into a well bore penetrating at least a portion of a subterranean formation at or above a pressure sufficient to create or enhance one or more fractures in the portion of the subterranean formation.

16 Claims, 4 Drawing Sheets

(51) Int. Cl.
*C09K 8/62* (2006.01)
*C09K 8/70* (2006.01)
*C09K 8/92* (2006.01)
*E21B 43/04* (2006.01)
*E21B 43/26* (2006.01)

(52) U.S. Cl.
CPC .............. *E21B 43/04* (2013.01); *E21B 43/26* (2013.01); *E21B 43/267* (2013.01); *C09K 2208/08* (2013.01); *C09K 2208/10* (2013.01)

(58) Field of Classification Search
USPC ........................................................ 166/280.2
See application file for complete search history.

(56) References Cited

U.S. PATENT DOCUMENTS

| | | | |
|---|---|---|---|
| 6,753,388 | B1 | 6/2004 | Whipple et al. |
| 7,786,049 | B2 | 8/2010 | Temple et al. |
| 8,011,514 | B2 | 9/2011 | Wright et al. |
| 8,323,360 | B2 | 12/2012 | Baran, Jr. et al. |
| 8,985,213 | B2 | 3/2015 | Saini et al. |
| 2009/0044945 | A1* | 2/2009 | Willberg ................ C09K 8/706 166/308.1 |
| 2009/0124533 | A1 | 5/2009 | Roddy |
| 2010/0212897 | A1* | 8/2010 | Nguyen ................ E21B 43/267 166/280.1 |
| 2012/0103916 | A1 | 5/2012 | Davis et al. |
| 2012/0125862 | A1 | 5/2012 | Dai et al. |
| 2012/0247764 | A1* | 10/2012 | Panga ...................... C09K 8/70 166/280.2 |
| 2013/0048571 | A1 | 2/2013 | Chen et al. |
| 2013/0157906 | A1 | 6/2013 | Huang et al. |
| 2013/0284437 | A1 | 10/2013 | Nguyen et al. |
| 2014/0008067 | A1 | 1/2014 | Roddy et al. |

OTHER PUBLICATIONS

Nguyen, Philip D., et al. "Evaluating treatment methods for enhancing microfracture conductivity in tight formations." SPE Paper 167092, from SPE Unconventional Resources Conference and Exhibition—Asia Pacific. Society of Petroleum Engineers, 2013.

International Preliminary Report on Patentability issued in related Application No. PCT/US2014/012503, dated Aug. 4, 2016 (12 pages).

CAS Database List entry for "Poly(Styrene-co-divinylbenzene)" found at https://www.chemicalbook.com/ChemicalProductProperty_EN_CB6320979.htm, 1 page.

* cited by examiner

“CLUSTERS OF MICRON- AND NANO-SIZED PROPPANT FOR USE IN SUBTERRANEAN OPERATIONS”

CROSS-REFERENCE TO RELATED APPLICATION

The present application is a U.S. National Stage Application of International Application No. PCT/US2014/012503 filed Jan. 22, 2014, which is incorporated herein by reference in its entirety for all purposes.

BACKGROUND

The present disclosure relates to compositions and methods for use in subterranean operations, and more specifically, compositions and methods for forming and using clusters of micron- and/or nano-sized solid materials (e.g., particulates, fibers, etc.) as proppants in subterranean operations.

In the production of hydrocarbons from a subterranean formation, the subterranean formation should be sufficiently conductive to permit the flow of desirable fluids to a well bore penetrating the formation. Various types of stimulation treatments may be used to enhance the production potential of a subterranean formation. One type of treatment used in the art to increase the production potential of a subterranean formation is hydraulic fracturing. Hydraulic fracturing operations generally involve pumping a treatment fluid (e.g., a fracturing fluid or a "pad fluid") into a well bore that penetrates a subterranean formation at or above a sufficient hydraulic pressure to create or enhance one or more pathways, or "fractures," in the subterranean formation. These fractures expose large surfaces areas of the formation and provide a path or conduit back to the wellbore to enhance the capability to produce larger volumes of hydrocarbon from very low permeability reservoirs. The fluid may comprise particulates, often referred to as "proppant particulates," that are deposited in the resultant fractures. The proppant particulates are thought to help prevent the fractures from fully closing upon the release of the hydraulic pressure, forming conductive channels through which fluids may flow to a well bore. Thus, the effective placement and retention of proppant within a fracture is often crucial to maintaining fluid flow in the stimulated region of the formation.

BRIEF DESCRIPTION OF THE FIGURES

These drawings illustrate certain aspects of some of the embodiments of the present disclosure, and should not be used to limit or define the disclosure.

Figure 1:
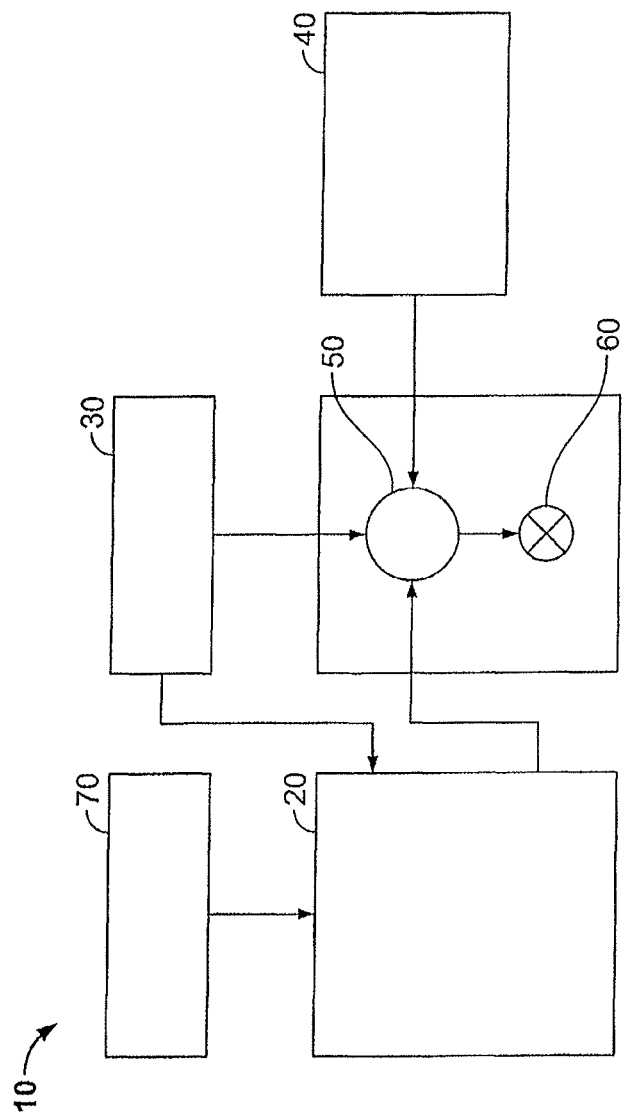
FIG. 1 is a diagram illustrating an example of a fracturing system that may be used in accordance with certain embodiments of the present disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure relates to compositions and methods for use in subterranean operations, and more specifically, compositions and methods for forming and using clusters of micron- and/or nano-sized solid materials (e.g., particulates, fibers, etc.) as proppants in subterranean operations.

More specifically, the present disclosure provides compositions (e.g., fracturing fluids) comprising a plurality of small-sized solid materials, such as particulates and/or fibers, and one or more surface modifying agents. As used herein, the term "small-sized solid materials" refers to materials that consist of micro-sized solids, nano-sized solids, or any combination thereof. The surface modifying agent may, among other functions, bind a plurality of small-sized particulates and/or fibers together to form one or more small clusters that may be used as proppant in a subterranean formation. Such proppant clusters may be used, for example, in fracturing operations to prop open and maintain the permeability of fractures in tight formations, microfractures, and/or dendritic fractures in the tip region of a primary fracture or far-field areas of a subterranean formation (e.g., the area of a formation that is from about 10 feet to 3000 feet from the well bore, or the area of a formation that is from about 20 feet to 1000 feet from the well bore). As used herein, the term "microfracture" refers to a discontinuity in a portion of a subterranean formation creating a flow channel, the flow channel generally having a width or flow opening size in the range of from about 1 µm to about 250 µm. In certain embodiments, the surface modifying agent also may help anchor proppant clusters onto fracture faces where they are placed, which may help prevent the clusters from becoming displaced out of the fracture.

The methods and compositions of the present disclosure may, among other benefits, enable more effective stimulation (e.g., fracturing) of certain types of tight formations, such as shales, clays, coal beds, and/or gas sands, and may provide enhanced production potential by propping fractures open in these types of formations. In certain embodiments, the clusters of small-sized solids may be deformable under stress, which may allow them to enter smaller fractures without screening out at the entrance of the fracture. The combination of small particles and deformable masses may enable these clusters to be transported more easily in low viscosity fluids such as water so that they can be efficiently placed deep into a fracture system.

The micron- and/or nano-sized solid materials used in accordance with the present disclosure may comprise any solid materials known in the art of the applicable particle size, such as particulates and fibers. The micron-sized solids used in accordance with the present disclosure generally have average particle sizes ranging from about 1 micron to about 250 microns. In certain embodiments, the micron-sized particulates may have particle sizes smaller than 100 mesh (149 µm), and in certain embodiments may have particle sizes equal to or smaller than 200 mesh (74 µm), 230 mesh (63 µm) or even 325 mesh (44 µm). The nano-sized solids used in accordance with the present disclosure generally have average particle sizes ranging from about 10 nanometers to about 1000 nanometers. In certain embodiments, micron- or nano-sized fibers may be used in accordance with the present disclosure, the fibers having diameters less than about 250 microns and lengths less than about 3000 microns. In certain embodiments, the micron-sized fibers may have diameters of about 10 microns to about 250 microns and lengths of about 100 microns to about 3000 microns. In certain embodiments, micron- or nano-sized fibers may provide, among other properties, better stress distribution in a proppant pack as compared to other micron- or nano-sized solids.

The micron- and/or nano-sized solids may be intended for any applicable use in subterranean operations, for example, as proppant particulates, gravel particulates, suspending agents, or the like. The micron- and nano-sized solids may be naturally occurring or man-made, and may be comprised of any material known in the art that does not interfere with their intended use. Examples of suitable materials may include, but are not limited to, silica, silicates, glass, bauxite, sand, polymeric materials, ceramics, rubber, resins, composites, and the like. Suitable micron- and nano-sized particulates may have any physical shape, including but not limited to shapes such as platelets, shavings, fibers, flakes, ribbons, rods, strips, spheroids, discs, toroids, pellets, tablets, and the like. Suitable micron- and nano-sized fibers generally comprise elongated structures and may have any cross-sectional shape, including but not limited to, round, oval, trilobal, star, flat, rectangular, etc. One example of a micron-sized particulate material that may be suitable for use in accordance with the present disclosure is silica flour, for example, in the form of 325-mesh or 200-mesh silica powder. An example of a commercially-available product comprising these materials is the WAC-9™ fluid loss additive, available from Halliburton Energy Services, Inc. Another example of suitable micron-sized particulate materials that may be suitable for use in accordance with the present disclosure are microspheres such as N-1000 Zeeospheres™ available from Zeeospheres Ceramics LLC. One example of a nano-sized particulate material that may be suitable for use in accordance with the present disclosure are the Laponite® family of additives (nano-sized disc-shaped silicate crystals), available from Rockwood Specialties, Inc.

The micron- and/or nano-sized solids may be included in a fracturing fluid of the present disclosure in any amount that may be carried by the fluid. In certain embodiments, the fracturing fluids of the present disclosure may comprise a combination of micron-sized solids and nano-sized solids. In certain embodiments, the micron- and/or nano-sized solids may be included in a concentration of about 0.01 lbm/gal (pounds mass per gallon) to about 1 ppg. In certain embodiments, the micron- and/or nano-sized solids may be included in a concentration of about 0.05 lbm/gal to about 3.0 lbm/gal. In certain embodiments, the micron- and/or nano-sized solids may be included in a concentration of about 0.05 lbm/gal to about 0.5 lbm/gal. In certain embodiments, the sizes of the micron- and/or nano-sized solids and their respective amounts may be selected to provide a distribution of particle sizes that, among other benefits, facilitates the mixing and/or suspension of the solids in a gelled fluid and/or reduces settling of the solids. The amounts of nano-sized solids included in a fluid of the present disclosure also may affect the amount of micro-sized solids that can be included, and vice-versa. For example, including higher concentrations of nano-sized solids in a fluid of the present disclosure may require reducing the amount of micron-sized solids included in that fluid in order to effectively suspend the solids. A person of skill in the art, with the benefit of this disclosure, will recognize how to adjust the amounts of micro- and/or nano-sized solids in a particular fluid of the present disclosure to balance, among other factors, the suspension capability of the fluid, as well as the ability to pump, pour, and mix the fluid in its use.

The surface modifying agents used in accordance with the present disclosure may comprise any surface modifying agent known in the art that can bind a plurality of small-sized particulates and/or fibers together to form one or more small clusters. In certain embodiments, the surface modifying agent also may impart enhanced viscosity and/or other properties to the carrier fluid (e.g., a fracturing fluid) with which it is mixed. Suitable types of surface modifying agents include, but are not limited to: resins; tackifying agents; aggregating, agglomerating or conglomerating compositions; gelable and/or crosslinkable polymer compositions; and the like. In certain embodiments, a mixture of two or more surface modifying agents may be used. The surface modifying agents may be added in liquid form into the same fluid (e.g., fracturing fluid) carrying the micron- and/or nano-sized solids, or may be deposited on the surface of the micron- and/or nano-sized solids prior to their use. In embodiments where the surface modifying agent(s) are added into the fluid (e.g., fracturing fluid) carrying the micron- and/or nano-sized solids, the surface modifying agents may be added in any concentration that forms clusters of the micron- and/or nano-sized solids of the desired size for a particular operation. In certain embodiments, the surface modifying agent(s) may be added to the fluid in a concentration of from about 0.01% to about 1% by volume of the fluid. In certain embodiments, the surface modifying agent(s) may be added to the fluid in a concentration of from about 0.01% to about 0.75% by volume of the fluid. In certain embodiments, the surface modifying agent(s) may be added to the fluid in a concentration of from about 0.01% to about 0.5% by volume of the fluid. In certain embodiments, the surface modifying agent(s) may be added to the fluid in a concentration of from about 0.01% to about 0.2% by volume of the fluid. In certain embodiments, the surface modifying agent(s) may be added to the fluid in a concentration of less than about 1% by weight of the solids suspended in the fluid. In certain embodiments, the surface modifying agent(s) may be added to the fluid in a concentration of less than about 0.5% by weight of the solids suspended in the fluid. Using concentrations of surface modifying agent(s) in this range may, among other benefits, form clusters of the micron- and/or nano-sized solids of relatively constant sizes without generating large "clumps" of particulates. In certain embodiments, the average diameter of the proppant clusters formed using the methods and compositions of the present disclosure may be less than about 500 microns. However, the proppant clusters may be of any size that is smaller than the width of the fracture in which they are intended to be placed. For example, in certain embodiments, the average diameter of proppant clusters may be up to about one-third of the width of the fracture.

Proppant clusters of this size may be selected, among other reasons, to minimize bridging or "screening out" of the proppant clusters at the entrance into the fracture. As a person of skill in the art will recognize, the diameters of the proppant clusters formed may vary in a single composition, and the clusters may be non-uniform or irregular in size or shape.

In certain embodiments, the surface modifying agent may be partially or completely activated and/or cured at some point during the operation. For example, the surface modifying agent may be activated and/or cured after the micron- and/or nano-sized solids and surface modifying agent are introduced into the formation, for example, when exposed to higher temperatures in the formation and/or a chemical activator or curing agent. In certain embodiments, an activator may be used to cause the surface modifying agent to transition from a hydrophobic state to a hydrophilic state in which it is more likely to bind the micron- and/or nano-sized solids together. Activating and/or curing the surface modifying agent after it has been introduced into the formation may, among other benefits, allow an operator to delay the formation of clusters of the micron- and/or nano-sized solids, for example, until the solids reach a desired location in the formation (e.g., the open space of a fracture).

Resins suitable for use in accordance with the present disclosure may include all resins known in the art that are capable of forming a hardened mass. Examples of resins that may be suitable for use include, but are not limited to, two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. In one embodiment, the resin may comprise a mixture of dimerized fatty acid and bisphenol A-epichlorohydrin resin. Some suitable resins, such as epoxy resins, may be partially or completely cured, for example, with an internal catalyst or activator so that when pumped down hole, they may be cured using only time and temperature. Other resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable resin for use in embodiments of the present disclosure and to determine whether a catalyst is required to trigger curing.

Tackifying agents suitable for use in accordance with the present disclosure may comprise any compound that, when in liquid form or in a solvent solution, will form a tacky, non-hardening coating upon a particulate. Tackifying agents suitable for use in the present disclosure include non-aqueous tackifying agents; aqueous tackifying agents; silyl-modified polyamides, and the like. In certain embodiments, the tackifying agent may be prepared by condensing a blend of fatty acids with a polyamine to form a polyamide. For example, the aqueous-based tackifying agents used in the SandWedge® ABC and SandTrap® ABC services provided by Halliburton Energy Services, Inc. also may be suitable surface modifying agents for certain embodiments of the present disclosure.

Gelable compositions suitable for use as a surface modifying agent in accordance with the present disclosure may include those compositions that cure to form a semi-solid, gel-like substance. The gelable composition may be any gelable liquid composition capable of converting into a gelled substance capable of substantially plugging the permeability of the formation while allowing the formation to remain flexible. As referred to herein, the term "flexible" refers to a state wherein the treated portion of the formation is relatively malleable and elastic and able to withstand substantial pressure cycling without substantial breakdown of the formation. Thus, the resultant gelled substance stabilizes the treated portion of the formation while allowing the formation to absorb the stresses created during pressure cycling. As a result, the gelled substance may aid in preventing breakdown of the formation both by stabilizing and by adding flexibility to the treated portion. Examples of suitable gelable liquid compositions include, but are not limited to, gelable resin compositions, gelable aqueous silicate compositions, crosslinkable aqueous polymer compositions, and polymerizable organic monomer compositions.

Examples of other surface modifying agents that may be suitable for use in certain embodiments of the present disclosure include polyethyleneimine; amine-aldehyde mixtures comprising a silane coupling agent, polyacrylate salt polymer, acrylate salt/acrylamide copolymer, and/or water-soluble polymers including pendant hydroxamic acid or salt groups; silicon-containing polymers selected from the group consisting of silicon-containing polyethyleneimines, vinyl-triethoxysilane copolymers, copolymers of acrylic acid and triethoxysilypropylacrylamide, copolymers of acrylic acid and triethoxyvinylsilane, silicon-containing polysaccharides, silicon-containing styrene/maleic anhydride copolymers, silicon-containing maleic anhydride/alkyl vinyl either copolymers, and mixtures thereof; silane-base compositions comprising 3-glycidoxypropyl trimethoxysllane and N-[3-(trimethoxy-silyl)propyl ethylenediamine]; water soluble film-forming polymers selected from the group consisting of a poly(vinyl alcohol) and a poly(hydroxy alkyl cellulose), organo-functional trialkoxysilanes, and epichlorohydrin polyamine reaction products; and structurally-modified water-soluble polymers selected from the group consisting of emulsion polymers, dispersion polymers, and gel polymers, wherein the monomers of such polymers are selected from the group consisting of: acrylamide, methacrylamide, diallyldimethylammonium chloride, dimethylaminoethyl acrylate methyl chloride quaternary salt, acrylamidopropyltrimethylammonium chloride, dimethylaminoethyl methacrylate methyl chloride quaternary salt, methacrylamidopropyltrimethylammonium chloride, acrylic acid, sodium acrylate, ammonium acrylate, methacrylic acid, sodium methacrylate, and ammonium methacrylate.

Other types of surface modifying agents that may be suitable for use in certain embodiments of the present disclosure include aggregating, agglomerating, or conglomerating compositions that, when added to certain solid particulates containing metal oxides, the particles are modified so that an aggregation propensity, aggregation potential and/or a zeta potential of the particles are altered. In certain embodiments, such compositions may include an amine and a phosphate ester. Suitable amines may include, without limitation, any amine that is capable of reacting with a suitable phosphate ester to form a composition that forms a deformable coating on a metal-oxide-containing surface. Examples of amines that may be suitable for use in the methods and compositions of the present disclosure include, without limitation, aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixture of alkyl indoles, imidazole and alkyl imidazole or mixtures of alkyl imidazole, quinoline and alkyl quinoline or mixture of alkyl quinoline, isoquinoline and alkyl isoquinoline or mixture of alkyl isoquinoline, pyrazine and alkyl pyrazine or mixture of alkyl pyrazine, quinoxaline and alkyl quinoxaline or mixture of alkyl quinoxaline, acridine and alkyl acridine or mixture of alkyl acridine, pyrimidine and alkyl pyrimidine or mixture of alkyl pyrimidine, quinazoline and alkyl quinazoline or mixture of alkyl quinazoline, or mixtures or combinations thereof. Suitable phosphate esters may include, without limitation, any phosphate ester that is capable of reacting with a suitable amine to form a composition that forms a deformable coating on a metal-oxide containing surface or partially or completely coats particulate materials. Examples of phosphate esters that may be suitable for use in the methods and compositions of the present disclosure include, without limitation, phosphate esters of hydroxylated aromatics such as phosphate esters of alkylated phenols such as Nonylphenyl phosphate ester or phenolic phosphate esters. Other examples of phosphate esters include, without limitation, phosphate esters of diols and polyols such as phosphate esters of ethylene glycol, propylene glycol, or higher glycolic structures.

In certain embodiments, the surface modifying agent(s) may be provided in solutions and/or emulsions with one or more solvents. Any solvent that is compatible with the chosen surface modifying agent(s) and achieves the desired viscosity effect may be suitable for use in the present disclosure. Suitable solvents may be aqueous or nonaqueous and, in certain embodiments, may have high flash points (e.g., about 125° F.) because of, among other things, environmental and safety concerns. Examples of solvents that may be suitable in certain embodiments of the present disclosure include, but are not limited to, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d-limonene, 2-butoxy ethanol, butyl acetate, furfuryl acetate, butyl lactate, dimethyl sulfoxide, dimethyl formamide, fatty acid methyl esters, methanol, isopropanol, butanol, glycol ether solvents, and combinations thereof. Selection of an appropriate solvent is dependent on the resin chosen and is within the ability of one skilled in the art with the benefit of this disclosure.

The fracturing fluids of the present disclosure optionally may comprise any number of additional additives, among other reasons, to enhance and/or impart additional properties of the composition. For example, the compositions of the present disclosure optionally may comprise one or more salts, among other reasons, to act as a clay stabilizer and/or enhance the density of the composition. Other examples of such additional additives include, but are not limited to, surfactants, acids, fluid loss control additives, gas, nitrogen, carbon dioxide, foamers, corrosion inhibitors, scale inhibitors, catalysts, clay control agents, biocides, friction reducers, antifoam agents, bridging agents, flocculants, additional $H_2S$ scavengers, $CO_2$ scavengers, oxygen scavengers, lubricants, viscosifiers, gelling agents, breakers, weighting agents, relative permeability modifiers, wetting agents, coating enhancement agents, filter cake removal agents, antifreeze agents (e.g., ethylene glycol), diverting agents, additional particulates (e.g., particulates larger than the micron- and nano-sized particulates, such as conventional proppant particulates), and the like. A person skilled in the art, with the benefit of this disclosure, will recognize the types of additives that may be included in the fluids of the present disclosure for a particular application. In certain embodiments, the compositions of the present disclosure may not comprise a significant amount of cementitious materials.

The compositions of the present disclosure may be prepared using any suitable method and/or equipment (e.g., blenders, mixers, stirrers, etc.) known in the art at any time prior to their use. The compositions may be prepared at a well site or at an offsite location. In certain embodiments, the micron- and/or nano-sized solids and/or the surface modifying agent may be metered directly into a base treatment fluid (e.g., a fracturing fluid). In certain embodiments where a combination of micron-sized solids and nano-sized solids are used, the nano-sized solids may be mixed into a fluid before the micron-sized solids, among other reasons, because it may be more difficult to mix nano-sized solids into a fluid already containing micron-sized solids.

The methods and compositions of the present disclosure may be used during or in conjunction with any subterranean operation. For example, the methods and/or compositions of the present disclosure may be used in the course of a fracturing treatment in which a fracturing fluid may be introduced into the formation at or above a pressure sufficient to create or enhance one or more fractures in at least a portion of the subterranean formation. Such fractures may be "enhanced" where a pre-existing fracture (e.g., naturally occurring or otherwise previously formed) is enlarged or lengthened by the fracturing treatment. In certain embodiments, the fracturing fluid may be prepared, at least in part, by incorporating a slurry of the present disclosure with one or more other fluids. In certain embodiments, this may be accomplished using a pumping system and/or equipment similar to that described below. Other suitable subterranean operations in which the methods and/or compositions of the present disclosure may be used include, but are not limited to, acidizing treatments (e.g., matrix acidizing and/or fracture acidizing), hydrajetting treatments, sand control treatments (e.g., gravel packing), "frac-pack" treatments, and other operations where micron-sized and/or nano-sized particulates and/or fibers as may be useful.

A fracturing fluid of the present disclosure may be prepared by mixing one or more base fluids with a plurality of small-sized solids and/or the surface modifying agent by any means known in the art. The base fluid may comprise one or more aqueous based fluids, non-aqueous based fluids, or a combination thereof. For example, the base fluid may comprise water, slickwater, a hydrocarbon fluid, a polymer gel, foam, an emulsion, air, wet gases, and/or any combination thereof. The base fluid also may incorporate one or more additional additives, among other reasons, to impart or alter one or more properties of the fracturing fluid. The base fluid may be mixed with a plurality of small-sized solids and/or the surface modifying agent at a well site where the fracturing operation is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing.

The exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a pre-made proppant for combination with the fracturing fluid and/or, in the methods of the present disclosure, a plurality of micron-sized and/or nano-sized particulates and/or pre-formed clusters thereof. The system may also include additive source 70 that provides one or more additives (e.g., gelling agents, weighting agents, and/or other optional additives) used, among other purposes, to alter the properties of the fracturing fluid. In certain embodiments, additive source 70 may be used to provide the surface modifying agent that will be mixed with the fracturing fluid and plurality of micron-sized and/or nano-sized particulates. In other embodiments, other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional additives (e.g., the surface modifying agent) from the additives source 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, proppant source 40, and/or additives source 70 may be equipped with one or more metering devices (not shown) to control the flow of fluids, proppants, surface modifying agents, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants or slurries of the present disclosure at other times, and combinations of those components at yet other times.

Figure 2:
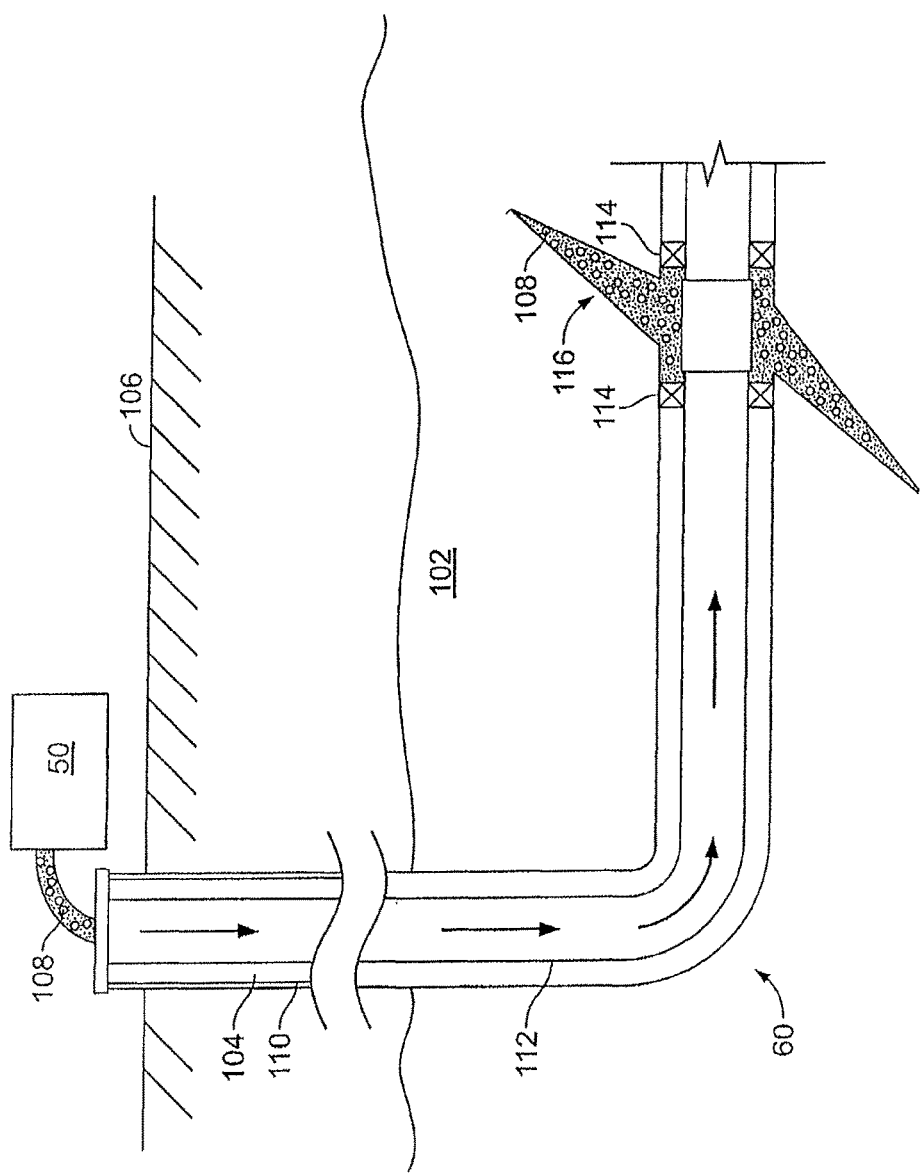
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro-jetting and/or other tools.

The well is shown with a work string 112 depending from the surface 106 into the well bore 104. The pump and blender system 50 is coupled a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 2 shows two packers 114, one defining an uphole boundary of the interval and one defining the downhole end of the interval. When the fracturing fluid 108 is introduced into well bore 104 (e.g., in FIG. 2, the area of the well bore 104 between packers 114) at a sufficient hydraulic pressure, one or more fractures 116 may be created in the subterranean zone 102. The clusters of micron-sized and/or nano-sized particulates in the fracturing fluid 108 may enter the fractures 116 where they may remain after the fracturing fluid flows out of the well bore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

To facilitate a better understanding of the present disclosure, the following examples of certain aspects of some embodiments are given. In no way should the following examples be read to limit, or define, the entire scope of the disclosure or claims.

EXAMPLES

Example 1

Figure 3:
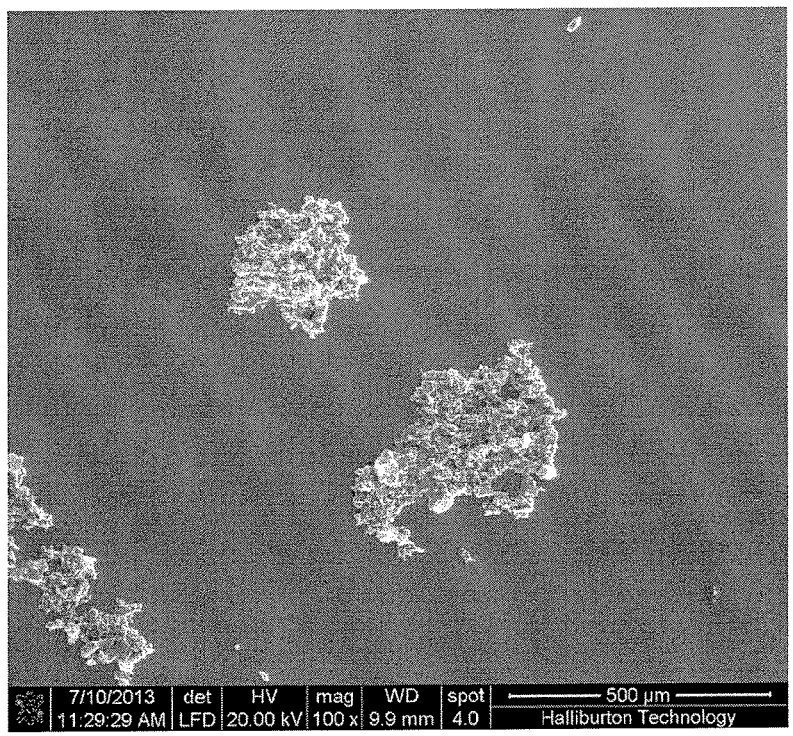
FIGS. 3, 4, 5, and 6 are images generated by an environmental scanning electron microscope in the course of testing certain embodiments of the present disclosure.

An aqueous slurry and solution of the present disclosure was prepared containing 3% w/v of KCl, 0.5% v/v SandWedge® ABC tackifying agent, and 0.1 lbm/gal of 325-mesh silica flour. A glass microscope slide was exposed to the solution while the solution was stirred with a magnetic stirrer at 500 RPM and heated to 140° F. After 1 minute of exposure, the glass slide was removed and air dried, and then placed in an environmental scanning electron microscope (ESEM) for analysis. FIG. 3 shows the ESEM image, which shows clusters of the silica flour particulates formed on the slide.

Example 2

Figure 4:
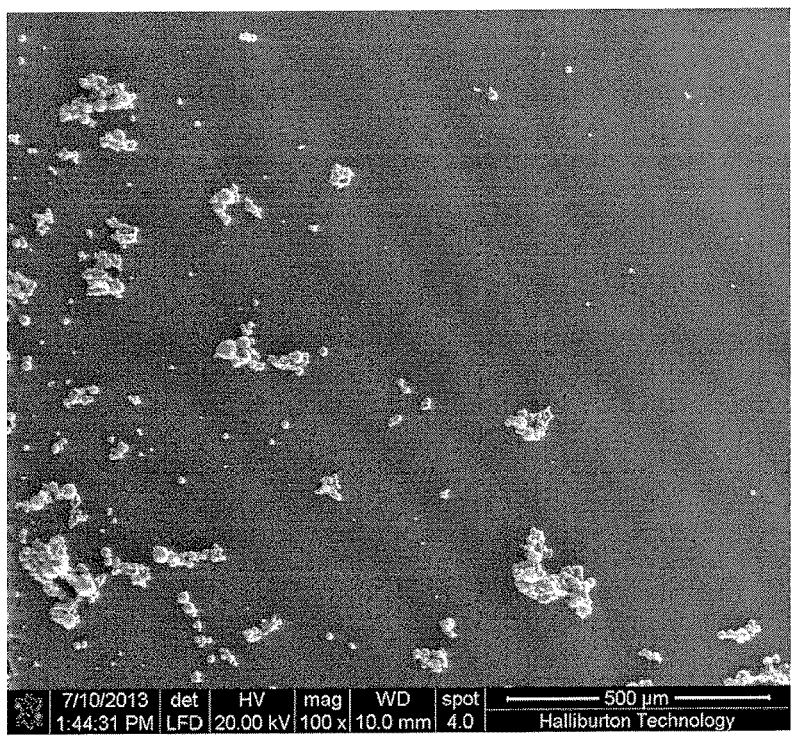

An aqueous slurry and solution of the present disclosure was prepared containing 3% w/v of KCl, 0.5% v/v SandWedge® ABC tackifying agent, and 0.1 lbm/gal of ceramic N-1000 Zeeospheres™. A glass microscope slide was exposed to the solution while the solution was stirred with a magnetic stirrer at 500 RPM and heated to 140° F. After 1 minute of exposure, the glass slide was removed and air dried, and then placed in an environmental scanning electron microscope (ESEM) for analysis. FIG. 4 shows the ESEM image, which shows clusters of the Zeeospheres™ formed on the slide.

Example 3

A split aluminum cylinder apparatus was prepared by cutting a 2-inch long aluminum cylinder with a 1-inch diameter in half along its axis. The two halves were machined to smooth their facing surfaces and their axial edges were matched to one another to minimize any grooves formed on one side of the cylinder. The two halves of the cylinder were put back together and installed in a Hassler sleeve for a core flow test to determine the initial effective permeability through region where they were split. The closure pressure on the cylinder was gradually increased to 1200 psi and backpressure was set to 200 psi. The effective permeability was determined by flowing nitrogen gas through the sleeve using three different flow rates and their corresponding differential pressures. The lowest flow rate was recorded as the initial permeability $K_i$ of the split cylinder, which is shown in Table 1 below.

The split faces of the aluminum cylinder were disassembled and exposed to the aqueous slurry and solution of the present disclosure prepared in Example 1 while the solution was stirred with a magnetic stirrer at 500 RPM and heated to 140° F. After 5 minutes of exposure, the two halves of the aluminum cylinder were removed and reassembled in the Hassler sleeve with their split faces aligned. A core flow test to determine regained permeability through the split cylinder after treatment was conducted using the same procedure used to determine the initial effective permeability. The lowest flow rate was recorded as the regained permeability $K_f$ of the split cylinder, which is shown in Table 1 below.

Figure 5:
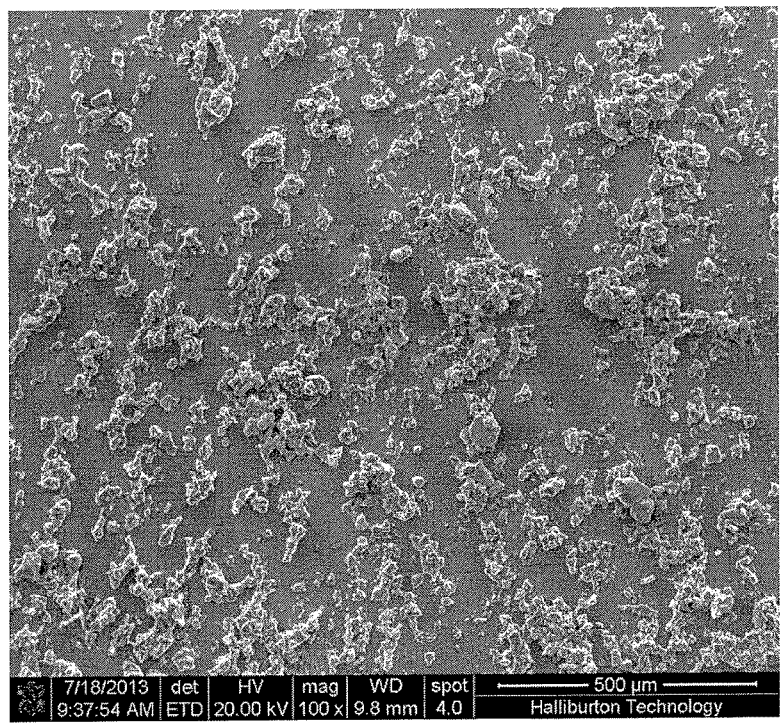

Following the effective permeability testing, the split aluminum cylinder was disassembled and one of the halves was placed in an ESEM for analysis. FIG. 5 shows the ESEM image, which shows clusters of the silica flour particulates formed on the cylinder.

Example 4

A split aluminum cylinder apparatus was prepared as described in Example 3, and its initial effective permeability was tested using the same core flow test procedure described therein. The split faces of the aluminum cylinder were disassembled and exposed to the aqueous slurry and solution of the present disclosure prepared in Example 2 while the solution was stirred with a magnetic stirrer at 500 RPM and heated to 140° F. After 5 minutes of exposure, the two halves of the aluminum cylinder were removed and reassembled in the Hassler sleeve with their split faces aligned. A core flow test to determine regained permeability through the split cylinder after treatment was conducted using the same procedure used to determine the initial effective permeability. The lowest flow rate was recorded as the regained permeability $K_f$ of the split cylinder, which is shown in Table 1 below.

Figure 6:
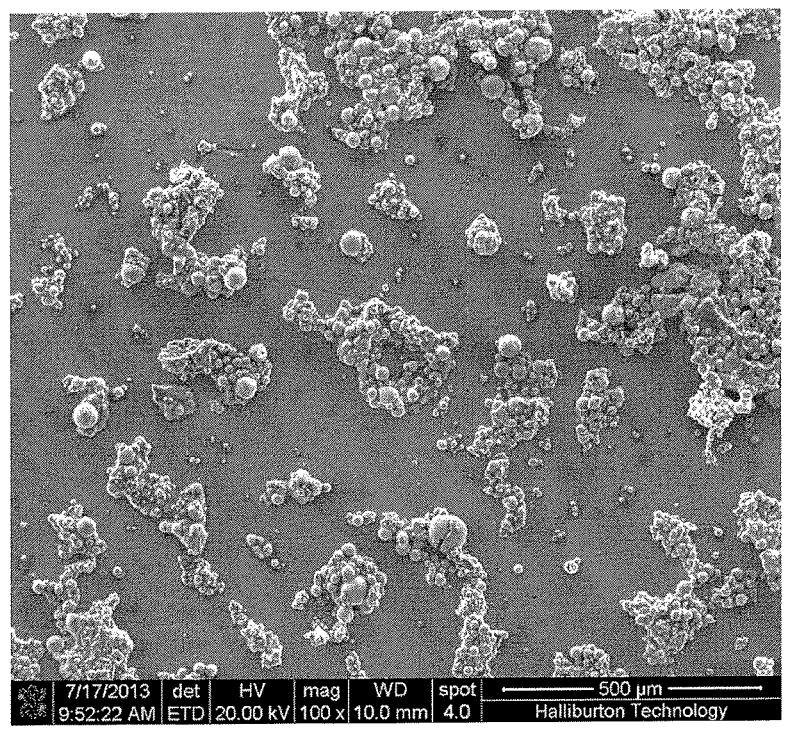

Following the effective permeability testing, the split aluminum cylinder was disassembled and one of the halves was placed in an ESEM for analysis. FIG. 6 shows the ESEM image, which shows clusters of the Zeeospheres™ formed on the cylinder.

TABLE 1

| Example No. | Ki (mD) | Kf (mD) |
| --- | --- | --- |
| Example 3 (325-mesh silica flour) | 0.92 | 13 |
| Example 4 (N-1000 Zeeospheres) | 0.45 | 61 |

Thus, Examples 1-4 demonstrate that the methods and compositions of the present disclosure may provide, among other benefits, enhanced permeability and/or production potential in subterranean fractures.

An embodiment of the present disclosure is a method comprising: providing a fracturing fluid comprising a base fluid, a plurality of small-sized solid materials and one or more surface modifying agents; forming a plurality of proppant clusters, each proppant cluster comprising two or more of the small-sized solid materials bound together with a portion of the one or more surface modifying agents; and introducing the fracturing fluid into a well bore penetrating at least a portion of a subterranean formation at or above a pressure sufficient to create or enhance one or more fractures in the portion of the subterranean formation.

Another embodiment of the present disclosure is a method comprising: providing a treatment fluid comprising a base fluid, a plurality of small-sized solid materials and one or more surface modifying agents; introducing the treatment fluid into a well bore penetrating at least a portion of a subterranean formation; forming a plurality of proppant clusters in the treatment fluid, each proppant cluster comprising two or more of the small-sized solid materials bound together with a portion of the one or more surface modifying agents; and depositing at least a portion of the proppant clusters in at least a portion of the subterranean formation.

Another embodiment of the present disclosure is a method comprising: providing a fracturing fluid comprising a base fluid, a plurality of small-sized solid materials and one or more surface modifying agents, wherein the surface modifying agent is present in an amount of less than about 1% by volume of the fracturing fluid; and introducing the fracturing fluid into a well bore penetrating at least a portion of a subterranean formation at or above a pressure sufficient to create or enhance one or more fractures in the portion of the subterranean formation.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
providing a fracturing fluid comprising a base fluid, a plurality of small-sized solid materials that comprises a plurality of micro-sized particulates and a plurality of nano-sized particulates, and one or more surface modifying agents,
  wherein the surface modifying agents are added to the fracturing fluid in liquid form and are present in an amount of less than 1% by volume of the fracturing fluid,
  wherein the small-sized solid materials are present in the fracturing fluid in a concentration of about 0.01 lbm/gal to about 1 lbm/gal by volume of the fracturing fluid, and
  wherein the plurality of nano-sized particulates has average particle sizes of from about 10 nanometers to about 1000 nanometers;
forming a plurality of proppant clusters, each proppant cluster comprising two or more of the small-sized solid materials bound together with a portion of the one or more surface modifying agents;
introducing the fracturing fluid into a well bore penetrating at least a portion of a subterranean formation at or above a pressure sufficient to create or enhance one or more microfractures in the portion of the subterranean formation; and
allowing one or more of the proppant clusters to enter an open space in the one or more microfractures.

2. The method of claim 1 the plurality of micron-sized particulates have an average particle sizes of from about 1 micron to about 250 microns.

3. The method of claim 1 wherein the plurality of micron-sized particulates comprise a plurality of micro-sized fibers.

4. The method of claim 1 wherein the small-sized solid materials comprise silica flour.

5. The method of claim 1 wherein the one or more surface modifying agents are present in the fracturing fluid in a concentration of from about 0.01% to about 0.2% by volume of the fracturing fluid.

6. The method of claim 1 wherein the one or more surface modifying agents comprise at least one component selected from the group consisting of: a resin, a tackifying agent, an aggregating composition, an agglomerating composition, a conglomerating composition, and any combination thereof.

7. The method of claim 1 further comprising mixing the plurality of small-sized solid materials and at least a portion of the one or more surface modifying agents into the fracturing fluid using mixing equipment.

8. The method of claim 1 wherein the fracturing fluid is introduced into the well bore using one or more pumps.

9. The method of claim 1 wherein the surface modifying agents are added to the fracturing fluid in liquid form as a solution or an emulsion.

10. A method comprising:
providing a treatment fluid comprising a base fluid, a plurality of small-sized solid materials that comprises a plurality of micro-sized particulates and a plurality of nano-sized particulates, and one or more surface modifying agents,
  wherein the surface modifying agents are added to the fracturing fluid in liquid form and are present in an amount of less than 1% by volume of the treatment fluid,
  wherein the small-sized solid materials are present in the treatment fluid in a concentration of about 0.01 lbm/gal to about 1 lbm/gal by volume of the treatment fluid, and
  wherein the plurality of nano-sized particulates has average particle sizes of from about 10 nanometers to about 1000 nanometers;
introducing the treatment fluid into a well bore penetrating at least a portion of a subterranean formation;
forming a plurality of proppant clusters in the treatment fluid, each proppant cluster comprising two or more of the small-sized solid materials bound together with a portion of the one or more surface modifying agents; and
depositing at least a portion of the proppant clusters in one or more microfractures in the subterranean formation.

11. The method of claim 10 wherein the one or more surface modifying agents are present in the treatment fluid in a concentration of from about 0.01% to about 0.2% by volume of the treatment fluid.

12. The method of claim 10 wherein the plurality of proppant clusters are formed in the one or more microfractures in the subterranean formation.

13. A method comprising:
providing a fracturing fluid comprising a base fluid, a plurality of small-sized solid materials that comprises a plurality of micro-sized particulates and a plurality of nano-sized particulates, and one or more surface modifying agents,
  wherein the one or more surface modifying agents are present in an amount of less than about 1% by volume of the fracturing fluid,
  wherein the small-sized solid materials are present in the fracturing fluid in a concentration of about 0.01 lbm/gal to about 1 lbm/gal by volume of the fracturing fluid, and
  wherein the plurality of nano-sized particulates has average particle sizes of from about 10 nanometers to about 1000 nanometers;

introducing the fracturing fluid into a well bore penetrating at least a portion of a subterranean formation at or above a pressure sufficient to create or enhance one or more microfractures in the portion of the subterranean formation; and forming a plurality of proppant clusters in the one or more microfractures in the subterranean formation.

14. The method of claim 13 further comprising forming a plurality of proppant clusters in the fracturing fluid, each proppant cluster comprising at least a portion of the plurality of small-sized solid materials, and at least a portion of the one or more surface modifying agents binding the portion of the plurality of small-sized solid materials together.

15. The method of claim 13 wherein the one or more surface modifying agents are present in the fracturing fluid in an amount of from about 0.01% to about 0.5% by volume of the fracturing fluid.

16. The method of claim 13 wherein the amount of the one or more surface modifying agents mixed into the fracturing fluid is from about 0.01% to about 0.2% by volume of the fracturing fluid.

* * * * *